(12) United States Patent
Casado et al.

(10) Patent No.: US 8,463,904 B2
(45) Date of Patent: Jun. 11, 2013

(54) SYSTEM AND METHOD OF MIDDLEBOX DETECTION AND CHARACTERIZATION

(75) Inventors: Martin Casado, Menlo Park, CA (US); Michael J. Freedman, Kingston, PA (US)

(73) Assignee: Quova, Inc., Mountain View, CA (US)

( * ) Notice: Subject to any disclaimer, the term of this patent is extended or adjusted under 35 U.S.C. 154(b) by 0 days.

(21) Appl. No.: 13/309,860

(22) Filed: Dec. 2, 2011

(65) Prior Publication Data
US 2012/0079104 A1 Mar. 29, 2012

Related U.S. Application Data (63) Continuation of application No. 11/855,745, filed on Sep. 14, 2007.

(60) Provisional application No. 60/844,331, filed on Sep. 14, 2006, provisional application No. 60/903,093, filed on Feb. 23, 2007.

(51) Int. Cl.
*G06F 15/173* (2006.01)

(52) U.S. Cl.
USPC ............ 709/224; 709/238; 370/389; 370/400

(58) Field of Classification Search
None
See application file for complete search history.

(56) References Cited

U.S. PATENT DOCUMENTS

| | | | |
|---|---|---|---|
| 6,947,978 B2 | 9/2005 | Huffman et al. | |
| 7,272,728 B2 | 9/2007 | Pierson et al. | |
| 7,330,871 B2 | 2/2008 | Barber | |
| 7,599,365 B1 | 10/2009 | Sabol et al. | |
| 7,937,467 B2 | 5/2011 | Barber | |
| 8,014,299 B2 | 9/2011 | Van Bemmel | |
| 8,204,982 B2 | 6/2012 | Casado et al. | |
| 2001/0016873 A1* | 8/2001 | Ohkado et al. | 709/205 |
| 2002/0138596 A1 | 9/2002 | Darwin et al. | |
| 2003/0093481 A1 | 5/2003 | Mitchell et al. | |
| 2005/0216844 A1* | 9/2005 | Error et al. | 715/745 |
| 2005/0281260 A1 | 12/2005 | Swanson et al. | |
| 2006/0013192 A1 | 1/2006 | Le et al. | |
| 2006/0187912 A1 | 8/2006 | Schwartz et al. | |
| 2007/0180122 A1 | 8/2007 | Barrett | |
| 2008/0072305 A1 | 3/2008 | Casado et al. | |

OTHER PUBLICATIONS

"U.S. Appl. No. 11/855,745, Final Office Action mailed Jun. 10, 2011", 12 pgs.
"U.S. Appl. No. 11/855,745, Non Final Office Action mailed Nov. 26, 2010", 11 pgs.
"U.S. Appl. No. 11/855,745, Response filed May 28, 2010 to Restriction Requirement mailed Apr. 28, 2010", 8 pgs.
"U.S. Appl. No. 11/855,745, Response filed Nov. 10, 2011 to Final Office Action mailed Jun. 10, 2011", 8 pgs.
"U.S. Appl. No. 11/855,745, Response filed Mar. 28, 2011 to Non Final Office Action mailed Nov. 26, 2010", 8 pgs.

(Continued)

*Primary Examiner* — Mohamed Ibrahim
(74) *Attorney, Agent, or Firm* — Schwegman Lundberg & Woessner, P.A.

(57) ABSTRACT

A computer-implemented system and method to detect and characterize middleboxes is disclosed. Embodiments of the system and method include a middlebox detection engine to provide a plurality of middlebox detection modules, and to use at least one middlebox detection module of the plurality of middlebox detection modules to determine if a middlebox exists on a path between a first communicating entity of a network and a second communicating entity of the network.

16 Claims, 5 Drawing Sheets

OTHER PUBLICATIONS

"U.S. Appl. No. 11/855,745, Restriction Requirement mailed Apr. 28, 2010", 8 pgs.

Eriksson, Brian, et al., "A Learning-Based Approach for IP Geolocation", PAM, [Online]. Retrieved from the Internet: <URL: http://nowak.ece.wisc.edu/geoloc1.pdf>, (2010), 10 pgs.

Laki, S, et al., "A Model Based Approach for Improving Router Geolocation", Computer Networks 54, (2010), 1490-1501.

"U.S. Appl. No. 11/855,745, Notice of Allowance mailed Mar. 6, 2012", 5 pgs.

"U.S. Appl. No. 11/855,745, Notice of Allowance Mailed Dec. 14, 2011", 9 pgs.

* cited by examiner

SYSTEM AND METHOD OF MIDDLEBOX DETECTION AND CHARACTERIZATION

CROSS REFERENCE TO RELATED APPLICATIONS

This application is a continuation of and claims the benefit of priority under 35 U.S.C. §120 to U.S. patent application Ser. No. 11/855,745, filed on Sep. 14, 2007, which claims priority to the filing date of U.S. Provisional Patent Application Ser. No. 60/844,331, filed Sep. 14, 2006, and entitled, "NOVEL TECHNIQUES FOR NETWORK MEASUREMENT, GEOLOCATION, AND CLIENT TRACKING USING SERVER SIDE MEASUREMENT AND ACTIVE CONTENT", and also claims priority to the filing date of U.S. Provisional Patent Application Ser. No. 60/903,093, filed Feb. 23, 2007, and entitled, "SYSTEM FOR NAT AND PROXY DETECTION AND CHARACTERIZATION", the benefit of priority of each of which is claimed hereby, and each of which are incorporated by reference herein in its entirety.

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots which may be described below and in the drawings that form a part of this document: Copyright© 2007, Quova, Inc. All Rights Reserved.

TECHNICAL FIELD

The present document relates generally to the technical field of networking and, in one example, a system and method to detect and characterize middleboxes.

RELATED ART

Internet servers depend on an accurate knowledge of their clients' locations and identities for decisions concerning efficiency, admission control, and fraud detection. Online services often use Internet Protocol (IP) addresses as client identifiers when enforcing access-control decisions. Unfortunately, conventional layer-3 Network Address Translation devices (NAT's), layer-5 proxies, and other indirection points (e.g. middleboxes) increasingly render client locations and identities opaque. For example, if a client is exhibiting malicious behavior, such as attempting to post spam messages to online blogs or trolling servers for weak passwords, a server may blacklist the client's IP address to prevent further connections from the offending IP address. However, the blacklisted IP address may result in the denial of system access to many users who may be sharing the offending IP address either simultaneously via a middlebox or over time via the Dynamic Host Configuration Protocol (DHCP). The Dynamic Host Configuration Protocol (DHCP) is a set of rules used by communications devices such as a computer, router or network adapter to allow the device to request and obtain an IP address from a server which has a list of addresses available for assignment. Similarly, when IP addresses are naively used to allow access to a resource (e.g. whitelisting), an open proxy from an authenticated domain, such as a university, can enable Internet-wide access to the protected resource and thereby put the protected resource at risk.

Due to the apparent operational problems with IP address authentication, many websites have moved from using IP addresses as identifiers to requiring some form of registration or authentication, and then application-level identity checks. For example, it is not uncommon for wikis or web forums to require their users to register, login, and then present HTTP cookies on each access. Unfortunately, these extra authentication steps can be a usability hurdle and generally require more server-side resources. Because of these concerns, other websites continue to use IP whitelisting and blacklisting as the basis for managing client access, in spite of the inefficiencies described above. Financial services attempt to minimize on-line fraud by detecting anomalies between their client's expected and current locations. Many news and academic journal services perform admission control for institutional subscribers by explicitly whitelisting IP ranges. Unfortunately, network indirection points increasingly occlude a server's view of its clients. The degrading ability for servers to accurately determine the location and identity of its clients has detrimentally affected the server's ability to perform efficient and secure interactions with its networked clients.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

According to example embodiments described herein, systems and methods to detect and characterize middleboxes are described. In an example embodiment, there is provided a system having a deployable architecture for middlebox detection, as well as a number of example methods for identifying middleboxes and middlebox characteristics.

Other features will be apparent from the accompanying drawings and from the detailed description that follows. In the following description, for purposes of explanation, numerous specific details are set forth in order to provide a thorough understanding of embodiments. It will be evident, however, to one of ordinary skill in the art that the various embodiments may be practiced without these specific details.

Figure 1:
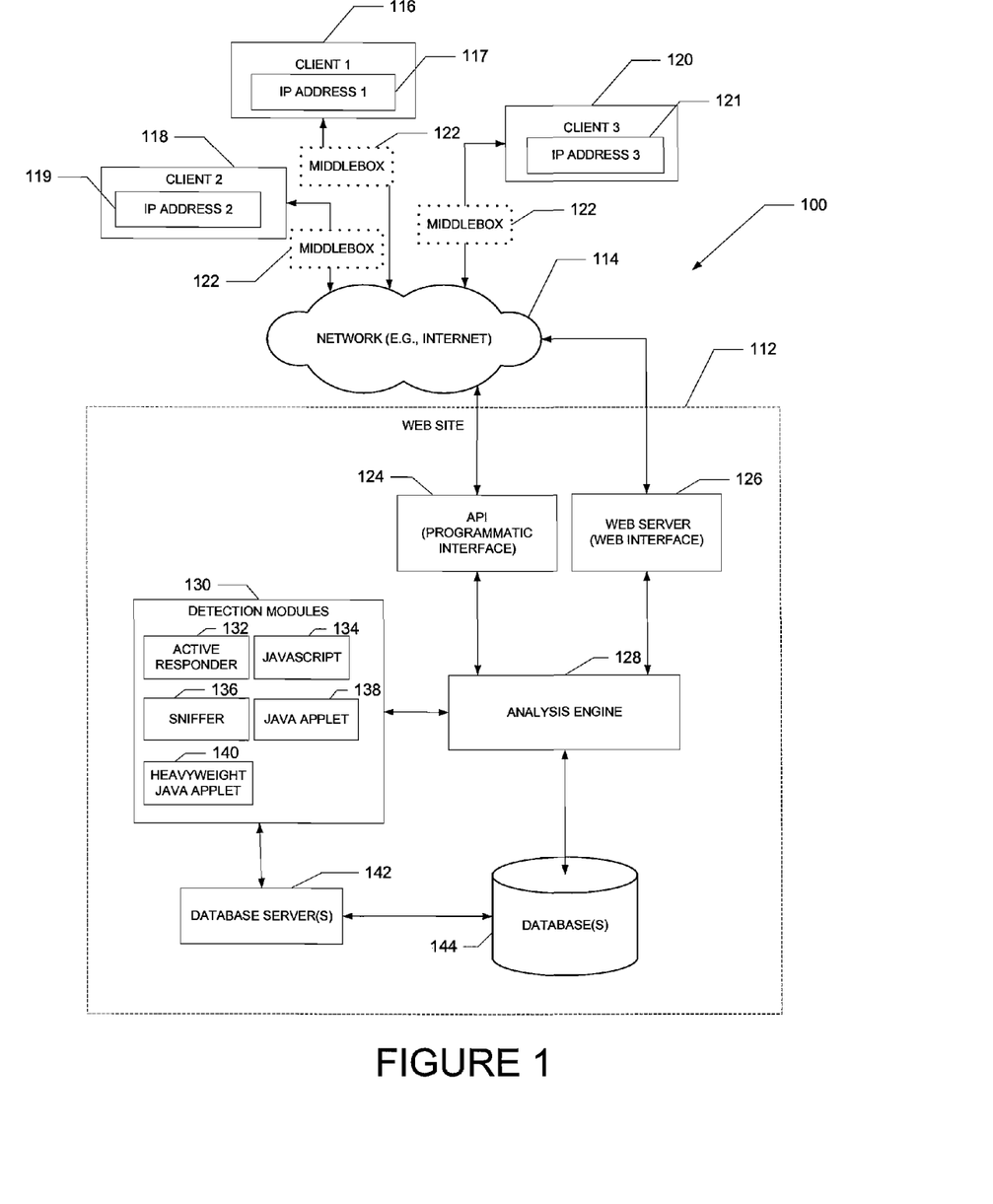
FIG. 1 illustrates a network diagram depicting a system, according to an example embodiment, having a client-server architecture.

FIG. 1 illustrates a network diagram depicting a system 100 having a client-server architecture, according to an example embodiment. A platform, in the example form of a website 112, provides server-side functionality and/or analysis, via a network 114 (e.g., the Internet) with regard to one or more clients 116, 118, 120. FIG. 1 illustrates, for example, clients 116, 118, 120 associated respectively with IP Address 117, IP address 119, and IP address 121. There may or may not be a middlebox 122 in between a first entity (the client) and a second entity (the website 112). Middlebox 122, if present, could be a NAT, a proxy, or other indirection point component.

Turning specifically to the website 112, an Application Programming Interface (API) 124 and a web server 126 are coupled to, and provide programmatic and web interfaces respectively to, an analysis engine 128 used to perform middlebox detection analysis. The analysis engine 128 is further coupled to one or more detection modules 130 and a database 144. The detection modules 130 may include an active responder 132, a javascript component 134, a sniffer 136, a java applet 138, and a heavyweight java applet 140, as described in more detail herein. The detection modules 130 are, in turn, shown to be coupled to one or more database servers 142 that facilitate access to one or more databases 144 for data storage and retrieval.

The analysis engine 128 determines which of the detection modules 130 will be used for detecting the presence of a middlebox 122 between a client (116, 118, or 120) and the website 112. One or more of the detection modules 130 or portions thereof can be transferred to a client (116, 118, or 120) and used to gather client information or perform detection processes with the client (116, 118, or 120). The client information and/or the detection data gathered by the detection modules 130 is transferred back to the analysis engine 128. The analysis engine 128 can subsequently perform middlebox detection analysis on the client information and/or the detection data gathered by the detection modules 130. As a result, the analysis engine 128 can perform middlebox detection and characterization. The client information, the detection data, and the operations of the analysis engine 128 and the detection modules 130 are described in more detail herein. While the detection modules 130 are shown in FIG. 1 to form part of the website 112, it will be appreciated that, in alternative embodiments, the detection modules 130 may be separate and distinct from the website 112.

Further, while the system 100 shown in FIG. 1 employs a client-server architecture, embodiments are not limited to such an architecture, and could equally well find applications in a distributed, or peer-to-peer architecture system. The various modules of detection modules 130 may also be implemented as standalone software programs, which do not necessarily have networking capabilities. Access to the analysis engine 128 and the detection modules 130 may be through the API 124 and/or the Web server 126.

FIG. 1 includes a high-level, component diagram of the middlebox detection system, according to an example embodiment. The system can be deployed as software, a single appliance, a service, or a distributed appliance. Example deployment configurations are described further herein.

Middleboxes may include Network Address Translators (NAT's) and/or proxies. NAT's allow multiple machines to share a single IP address. NAT's involve re-writing the addresses (e.g. the source and/or destination addresses) of IP packets. The addresses are usually rewritten as packets pass through a router or firewall. Most systems using NAT's do so in order to enable multiple hosts on a private network to access the Internet using a single public IP address (e.g. gateways). Many network administrators find NAT's a convenient technique and commonly use it. Nonetheless, NAT's can introduce complications in communication between hosts and may have a performance impact.

FIG. 1 illustrates Web Server 126 according to an example embodiment. Web Server 126 may serve active web content to clients and may use a number of techniques to gather data about the client and the client's network connection. The web server 126 may provide client-specific network information that is served to its clients. Information related to the web server's 126 interaction with it clients can be collected and retained.

FIG. 1 also illustrates detection modules 132, 134, 136, 138, and 140 according to an example embodiment. Methods for collecting client and network information for the purpose of middlebox detection and characterization are, in an example embodiment, abstracted as the detection modules 130 shown in FIG. 1. Each detection module includes the components to perform a specific test or suite of tests related to middlebox detection and/or characterization. Detection modules 130 may consist of active web content components, such as Javascript or Java, standalone processes and techniques for analyzing data that is collected. The system architecture is not limited to any set of detection modules. Standard detection modules 130 for an example system may include any of the following detection components.

Javascript fingerprinting: This detection component as part of the Javascript module 134 in an example embodiment includes a set of Javascript files that are served to clients to collect local configuration information and relay it back to the server. This information is used to both fingerprint the client and collect information regarding the client's locale. The locale portion of the module may compare the location information collection from the client with that known about the client's public-facing IP address.

Javascript Latency Measurements: This detection component as part of the Javascript module 134 in an example embodiment has three components; a standalone process that collects latency information from the web-server to the machine to which the client's public-facing IP address is associated, Javascript for collecting application level latency measurements, and back end data processing for making a determination as to whether a middlebox exists.

SYN (Synchronization packet) Fingerprinting: This detection component as part of the sniffer module 136 in an example embodiment uses a standalone process that sniffs the network and collects passive fingerprint information from client connections. This information is relayed to a back-end component which analyzes the fingerprint to determine the likelihood that the fingerprint represents a middlebox. Web servers capture the SYN packet of all incoming requests and use the SYN packet to generate a SYN fingerprint. The SYN fingerprint is then used to try and determine the sending host-type. For common operating systems, SYN fingerprinting may be relatively accurate.

Java Applet: This detection component as part of the Java applet module 138 in an example embodiment includes an applet that is sent to the client and a component in the web-browser. The client gathers local client configuration information (such as proxy settings), local network information (such as local port number and the local IP address) and relays this information back to the web-server. The applet also tries to create a socket connection back to the web-server along with a "host:" header to a well known website (such as Google). If the applet is redirected to the website's page, the applet can determine that a middlebox exists.

User-Agent string collector: This detection component collects User-Agent strings seen from particular IP addresses and stores them in the database. The functionality of the User-Agent string collector can be integrated into the web-server 126.

Further details of example methods used for middlebox detection are described in more detail below.

As shown in FIG. 1, the database 144 can be used to aggregate information collected from all clients seen by the detection system. The various detection modules 130 described above can be used to analyze current data results from the detection modules 130 as well as historical data in the database 144 to determine whether or not a public IP address represents a NAT or a proxy (e.g. a middlebox), and the characteristics of that middlebox. This is done in an example embodiment by comparing the results obtained from the various detection modules 130 and the long-term history of the IP address as contained in the database 144.

A customer (e.g. web service) interface provides a means for customers to query whether a client session or an IP address represents a middlebox as determined by the analysis engine 128 and the detection modules 130. Information returned to the customer from the analysis engine 128 and the detection modules 130 via the customer interface specifies whether or not the client is a proxy or a NAT, the characteristics (including size and estimations on the geographic diversity of the clients) of the proxy along with a confidence factor.

An example use for the middlebox detection system of a particular embodiment is to enable a web service to determine whether or not a client is using a proxy or NAT and, if so, to determine the characteristics of the proxy or NAT and a location of the client. To use the middlebox detection system, the customer (e.g., a web-service) may redirect their clients to the middlebox detection system. This can be done using any redirection mechanism, for example including a small "web-beacon" (e.g., a 1 pixel iframe) in the pages that the customer serves. When a client downloads these pages, the client subsequently requests this web object from a middlebox detection system server. Alternatively, a server may integrate client side middlebox detection by redirecting link click-through traffic to the middlebox detection system. This causes clients to load the web-beacon before they are redirected back to the link's real destination. Whether through a web-beacon or a redirect, the client executes code (e.g. javascript) that collects various client configuration parameters (e.g. browser version information, screen parameters, system languages, timezone settings, etc.). Java-enabled clients may also execute a Java applet that creates a socket connection back to the middlebox detection system, from which the client grabs its local IP address and ephemeral port. Differences between the client's local IP address and its public IP address can indicate the existence of an on-path middlebox.

For embodiments using a web-beacon as a redirection mechanism, a client request may initiate the following sequence of events.

1. The client will request a web page from the customer's server.

2. The customer includes the web-beacon in the web-page. The web-beacon contains an embedded link to the middlebox detection system.

3. The client can use the web beacon to request client code from the middlebox detection system. The client code includes a set of active content used to gather client information used to determine whether the client is behind a proxy or NAT (i.e. middlebox detection). Note that, in one example embodiment, all tests may not be run simultaneously, but instead staged dependent on the results of previous tests.

4. The active client code is executed by the client and returns results to the middlebox detection system.

5. The middlebox detection system aggregates and analyzes the results collected from all tests of a particular session. The results are cached for retrieval by the customer who may query the result asynchronously.

6. The middlebox detection system archives all collected data to do different types of analysis across multiple sessions.

In particular embodiments, middlebox detection can be performed using a variety of techniques. For example, some middlebox indicators include, 1) checking HTTP headers, 2) SYN fingerprinting clients, 3) geolocating clients, 4) comparing client timezone parameters against geolocation information, 5) comparing client language parameters against geolocation information, and 6) analyzing application versus network round-trip times. In a particular embodiment, techniques for analyzing these middlebox indicators are included in one or more of the detection modules 130. Each of these techniques are described in more detail below.

In other embodiments, middlebox detection can be performed using more intrusive techniques. One method is to attempt to connect back to an incoming client's IP address at known proxy ports. This technique only works for public proxies. Another approach is to use a client-side Java applet that issues a GET request for a popular object from a different domain than the server (e.g. a banner image from Google.com). A successful request implies a cache hit on an on-path proxy.

In a first middlebox detection technique, a middlebox detection system can check HTTP headers. Web proxies, under the HTTP/1.1 specification, are required to add their information to a Via header for both HTTP requests and responses that they proxy. Unfortunately, not all proxies do such. But those that do can be detected as proxies using the HTTP Via header.

In a second middlebox detection technique, a middlebox detection system can perform SYN fingerprinting of clients. In a particular embodiment, the middlebox detection system can capture the SYN packet of all incoming requests and use the SYN packet to generate the client's SYN fingerprint. SYN fingerprints provide an estimate of the sender's operating system. In the case of web proxies, which terminate their clients' TCP sessions, the SYN fingerprint corresponds to the proxy's TCP stack, not that of the clients. SYN fingerprints can be immediately used to uncover a variety of operating systems not commonly belonging to end-hosts (e.g. Cisco, NetApp, and Tru64). The utility of SYN fingerprinting can be extended by combining SYN fingerprint information with operating system information returned in a client's HTTP User-Agent string. Specifically, a host can be flagged as a proxy if the host SYN fingerprint differs sufficiently from its User-Agent host type. Conversely, the host can be flagged as a non-proxy if the host SYN fingerprint is sufficiently similar to its User-Agent host type.

In a third middlebox detection technique, a middlebox detection system can perform geolocating of clients. Given a client's local IP address (e.g. as provided by the Java applet) and its public IP address, known geolocation information can be used to compare against these two IP addresses. In some cases, a proxy can be detected if the local IP address and the public IP address differ in location based on the geolocation information.

In a fourth middlebox detection technique, a middlebox detection system can compare client timezone parameters against geolocation information. A web client exposes its timezone information in its Date header (as well as directly using javascript). In a particular embodiment, the middlebox detection system can compare the client timezone information to that of its geolocated public IP address, over all client requests arising from that IP address.

In a fifth middlebox detection technique, a middlebox detection system can compare client language parameters against geolocation information. Client language parameter information can be collected via client code (e.g. javascript) or via the Accept-Languages HTTP header. After building a database that maps languages to countries, the middlebox detection system can determine the country corresponding to the client's language parameters. Then, the middlebox detection system can determine if the client's IP address is located within the country using that language. If a pre-determined percentage of an IP address's clients cannot be matched to a particular country associated with the clients' language parameters, the IP address can be determined to be a proxy.

In a sixth middlebox detection technique, a middlebox detection system can analyze application versus network round-trip times (RTT). In this detection technique, the middlebox detection system compares the difference between TCP RTT measurements on the server-side to the minimum request time over multiple HTTP GET requests issued by the client. In a particular embodiment, client code (e.g. javascript) can be used to perform the application-level RTT measurements (e.g. by timing asynchronous XMLHttpRequests). If a large difference between application RTT and network RTT exists, the middlebox detection system can determine that the client is using a proxy. While non-proxies can show an RTT gap, likely due to application-layer scheduling delays, the RTT gap among clients of proxies is much more significant and thus detectable. Additionally, unlike other proxy detection techniques which use client-supplied configuration state, the RTT middlebox detection technique is less susceptible to malicious clients; because, a client that does not have control over the proxy it traverses can only make itself appear further from its proxy, which will more likely cause the client to be classified as being behind a proxy.

In a particular embodiment, a history-based middlebox detection technique may also be used. In this case, the middlebox detection system can identify large NAT's and proxies, and distinguish between the two, by using the history of requests seen from a particular IP address or prefix. For this analysis, the middlebox detection system may record the public IP address, the SYN fingerprint, and the HTTP User-Agent string for each request. Once a history of this information is obtained, the middlebox detection system can determine that non-NAT'd hosts show little variability in User-Agent strings and SYN fingerprints, as compared to clients behind middleboxes. Coupled with cookie usage, the heuristic provides a strong first-order differentiator of NAT'd hosts and non-NAT'd hosts. Second, given that non-NAT'd hosts show little variability in these parameters, the middlebox detection system can differentiate between individual clients behind a middlebox using User-Agents alone, as the User-Agent strings have a large amount of entropy. Finally, the middlebox detection system can determine the accuracy of detecting and differentiating between NAT'd and proxied networks by analyzing the distribution of User-Agent strings and SYN fingerprints.

In particular embodiments, independent comparisons may be performed to distinguish a proxy from a NAT. An IP address may be considered a proxy if its request contained a standard proxy header (e.g. Via). A middlebox may be classified as a NAT if, 1) the SYN fingerprint was not a known proxy type (e.g. Cisco or NetApp), 2) the request did not contain proxy headers, 3) the domain name of the middlebox was not suggestive of a proxy (e.g. contained proxy, prx, cache, or dmz), and finally 4) the ratio of distinct User-Agent strings to distinct SYN fingerprints per IP address was less than a pre-determined threshold (e.g. at most three). Few non-NAT'd hosts have multiple User-Agents; non-NAT'd hosts rarely have more than three User-Agents.

Figure 2:
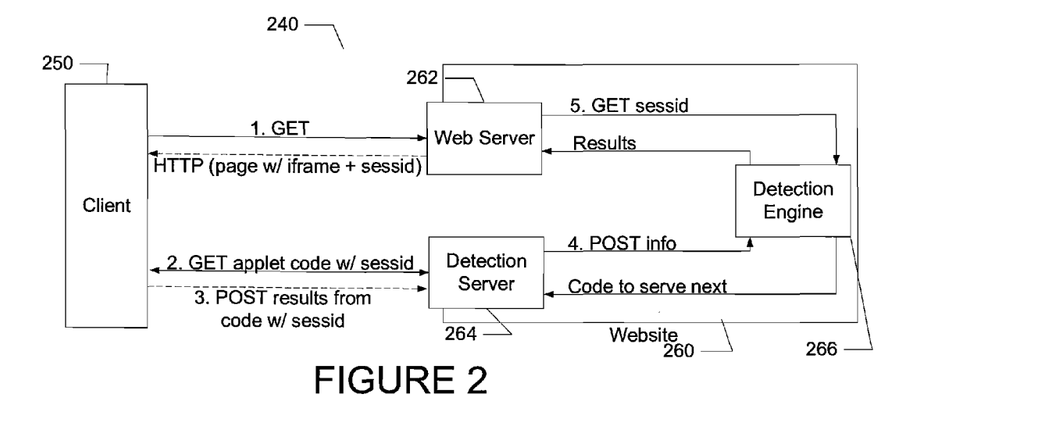
FIG. 2 illustrates a network diagram depicting a middlebox detection system, according to an example embodiment.

FIG. 2 illustrates an example embodiment of a middlebox detection system 240 providing real-time proxy and NAT detection to aid in access control decisions or other IP analytics applications. In the example embodiment of FIG. 2, a detection server 264 is integrated into an existing website 260. The website 260 includes both a standard web server 262 (serving dynamic webpages), the detection server 264, and a detection engine 266 in which any of the middlebox detection techniques described above may be implemented.

In operation, the example embodiment 240 shown in FIG. 2 performs a series of operations to gather information and perform middlebox detection analysis. First, the webserver 262 enables communication between the client 250 and the detection server 264 by adding an embedded web beacon (e.g. embedded iframe or script object) to any webpages for which the website 260 wishes to gather IP-based information (see operation 1 shown in FIG. 2). The embedded web beacon returned by the web server 262 is tagged with a unique session identifier (sessid), which can be used later to identify a particular client as multiple clients may share the same public IP address. The client 250 can then use the embedded object (e.g. web beacon) to request a component of client code (e.g. applet code) from the detection server 264 (see operation 2 shown in FIG. 2). As a result, the detection server 264 serves an appropriate component of client code (e.g. javascript or Java applet) to the client 250. The client code can be loaded on the client 250 in the background and therefore does not contribute to client-perceived latency on modern browsers. After executing, this active client code can send client-generated information back to the detection server 264 along with the session identifier specified by web server 262 (see operation 3 shown in FIG. 2). The client-generated information can include the client configuration information, RTT information, IP address information, or other client information used for middlebox detection as described above. After receiving the client-generated information from the client 250, the detection server 264 forwards the client-generated information to the detection engine 266 for processing (see operation 4 shown in FIG. 2). The detection engine 266 both stores the client-generated information for historical analysis and begins middlebox detection analysis on the client-generated information. The detection engine 266 can obtain IP geolocation information from various sources. Then, the detection engine 266 can use the client-generated information, the IP geolocation information, and related historical information to perform middlebox detection analysis using any of the middlebox detection techniques described in detail above. As a result of this analysis, the detection engine 266 can determine if the client 250 is (or is not) located behind a NAT or proxy. If the client 250 is determined to be behind a proxy, the detection engine 266 can determine where the client 250 may actually be located. Depending on the results of this analysis, the detection engine 266 may call for other client code to be executed by the client 250. In this case, the operations 2-4 shown in FIG. 2 are repeated. Finally, the results of the middlebox detection analysis can be queried by decision logic of the website 260. Using the session identifier, the website 260 can query the middlebox detection analysis for a particular client at any point after the analysis for that client is complete.

Figure 3:
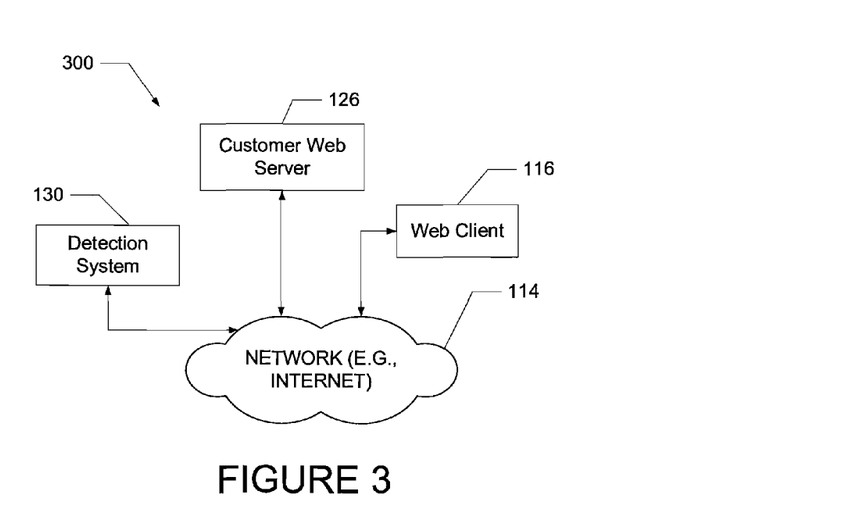
FIGS. 3 to 5 illustrate network diagrams depicting systems, according to example embodiments, having a client-server architecture.
Figure 4:
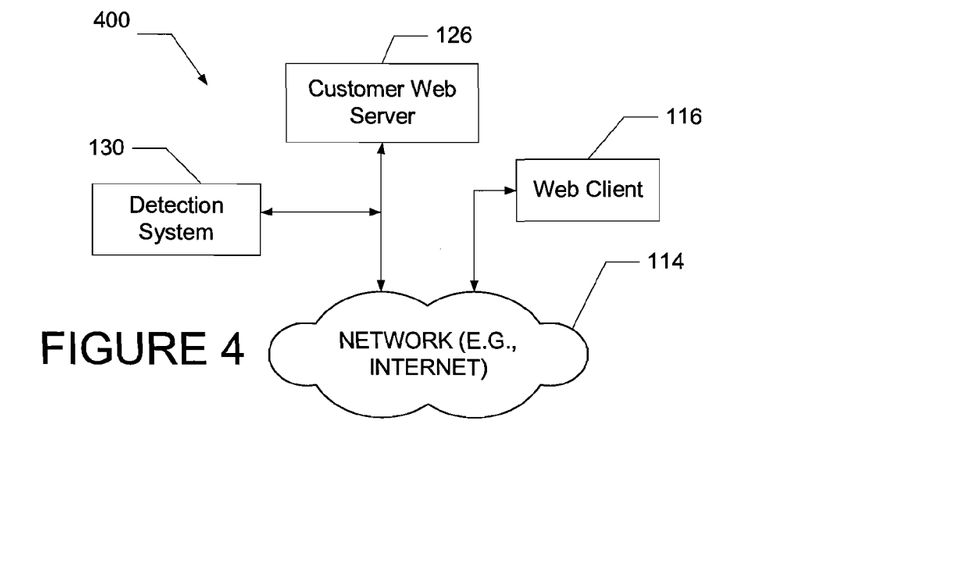
Figure 5:
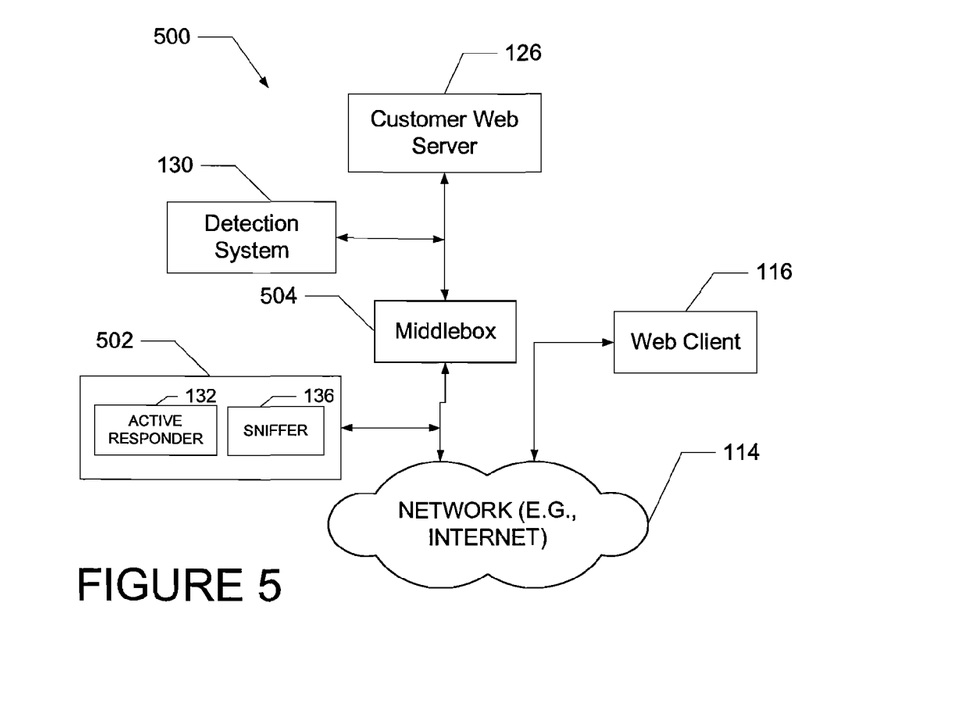

FIGS. 3-5 describe examples of various deployment scenarios in example embodiments. For the purposes of this discussion, an entity that wishes to know if a particular IP is a NAT or proxy is referred to as a "customer" and the user system being measured is referred to as the "client."

FIG. 3 illustrates an example hosted deployment scenario. In the example hosted deployment scenario, a third party entity can run the middlebox detection system and clients are redirected to the system over the Internet.

FIG. 4 illustrates an example local deployment. In the example local deployment, the detection system may be either a software package or a network appliance that is connected to the Internet at the customer's site.

FIG. 5 illustrates an example local deployment with a middlebox. For an example local deployment, a middlebox or proxy might render some of the tests ineffective (such as sniffing for the SYN fingerprint) or active probing. In this scenario, the stand-alone components 132, 136 of the detection modules 502 may be placed in a separate deployment outside of the middlebox 504.

Figure 6:
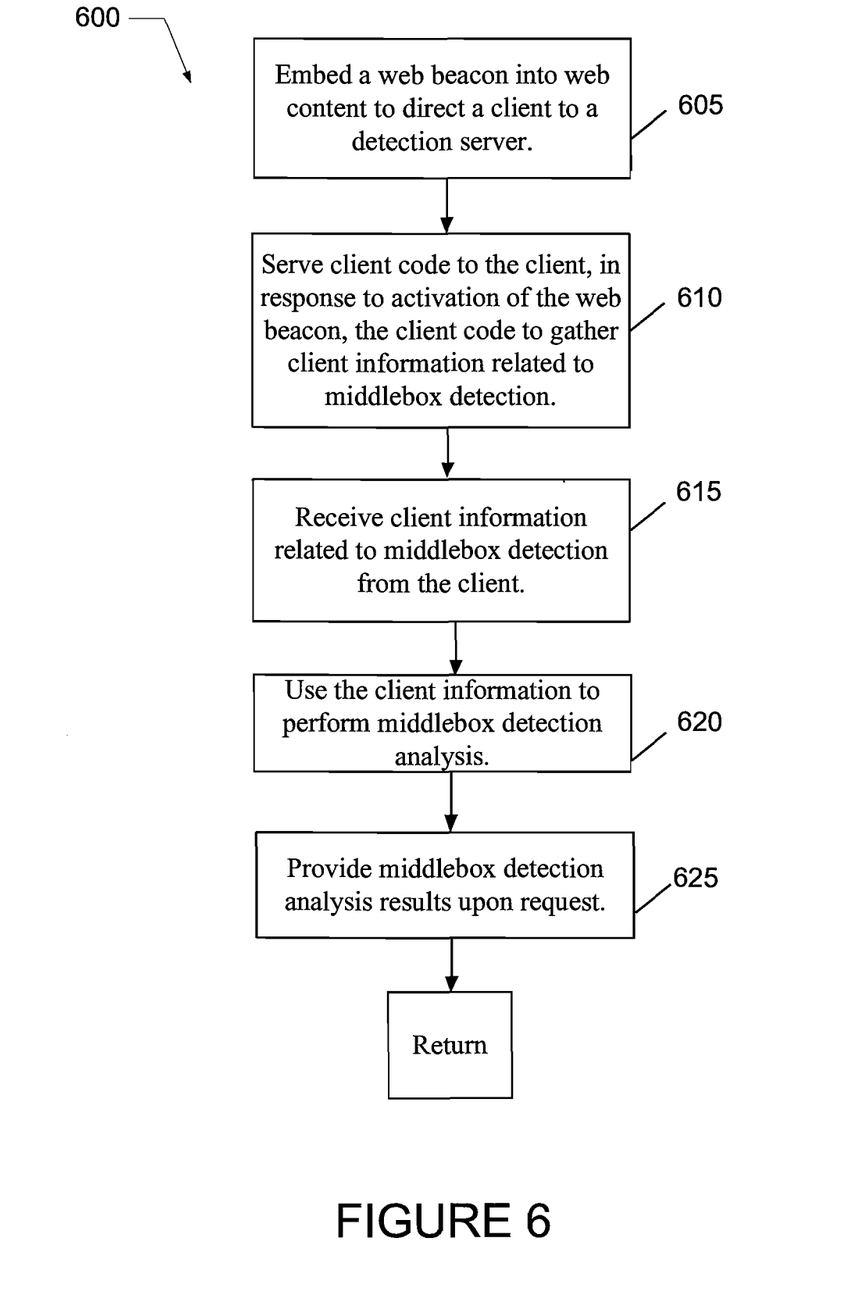
FIG. 6 illustrates a flow chart, according to an example embodiment.

FIG. 6 illustrates a flow chart, according to an example embodiment. The flow chart illustrates a series of operations 600 performed in an example process of a particular embodiment. In a first operation, the middlebox detection system of a particular embodiment embeds a web beacon into web content to direct a client to a detection server (processing block 605). In a second operation, the middlebox detection system of a particular embodiment serves client code to the client, in response to activation of the web beacon, the client code gathering client information related to middlebox detection (processing block 610). In a third operation, the middlebox detection system of a particular embodiment receives client information related to middlebox detection from the client (processing block 615). In a fourth operation, the middlebox detection system of a particular embodiment uses the client information to perform middlebox detection analysis (processing block 620). Finally, the middlebox detection system of a particular embodiment provides middlebox detection analysis results upon request (processing block 625).

Websites use geolocation in both content personalization and access control contexts. For example, Major League Baseball uses a GeoPoint server developed by Quova, Inc. to ensure that games are not webcast to subscribers subject to blackout conditions. Yet, end-users can often circumvent such restrictions by using proxies. Accurate middlebox detection is needed to prevent such behavior. Further, if a server can peer through a client's middlebox to determine the client's true location, advertisements can be more accurately targeted. Using the systems and methods to detect and characterize middleboxes as disclosed herein, accurate middlebox detection and more accurate targeted advertising can be achieved.

A Three-Tier Architecture

In some embodiments, one implementation may be as a distributed or non-distributed software application designed under a three-tier software architecture paradigm, whereby the various modules of computer code that make up the one implementation can be categorized as belonging to one or more of these tiers. A three-tier architecture may be used. The first tier may be an interface level that is relatively free of application processing. The second tier may be a logic level that performs processing in the form of logical/mathematical manipulations (logical manipulations) of data inputted through the interface level, and communicates the results of these logical manipulations with the Interface and/or backend or storage level. Some example embodiments may include these logical manipulations relating to certain business rules or tasks that govern the application as a whole. These logical manipulations and associated business rules may used to implement the operations described herein.

The third tier or storage level may be a persistent storage medium, or, some example embodiments may include non-persistent storage medium. One or more of these tiers may be collapsed into one another, resulting in a two-tier architecture, or one-tier architecture. For example, the interface and logic levels may be consolidated, or the logic and storage level may be consolidated, as in the case of an application with an embedded database.

This three-tier architecture may be implemented using one technology, or as will be discussed below, a variety of technologies. These technologies may include one or more object-oriented programming languages such as, for example, JAVA™, C++, DELPHI™, C#, or the like. Additionally, structured programming languages such as, for example, C, may also be used. Moreover, scripting languages such as, for example, Perl, Python, PHP, JAVASCRIPT™ or VBSCRIPT™ may also be used.

The three-tier architecture of a particular embodiment can be implemented in two or more computers organized in a server-client relationship, as is well known in the art, such that an interface level resides on a client computer, whereas a logic level resides on the application server (see below) and the storage level resides on a database server (see below). Such a relationship these three tiers can be implemented as various software components that communicate via distributed programming protocols. Some example embodiments may include these three tiers being implemented in a peer-to-peer configuration, with centralized or decentralized file and data sharing, or some other suitable file sharing paradigm, such that all three tiers reside on two or more computers and each computer retrieves files and data from one another.

A networked example embodiment may use a client-based browser application, whereas other embodiments may be implemented via a command line interface. Some example embodiments of a client-based browser application may include an Application Programming Interface (API) implemented to allow one application to communicate with another. Some well-known client-based browser applications include NETSCAPE™, INTERNET EXPLORER™, MOZILLA FIREFOX™, OPERA™, or some other suitable browser application. Common to these browser applications is the ability to utilize a Hyper-Text Transfer Protocol (HTTP) or Secured Hyper-Text Transfer Protocol (HTTPS) to get, upload (e.g., PUT) or delete web pages and interpret these web pages which are written in HTML and/or XML. HTTP and HTTPS are well known in the art, as are HTML and XML. HTTP and HTTPS are used in conjunction with a Transmission Control Protocol/Internet Protocol (TCP/IP) protocol as described in the Open Systems Interconnection Reference Model (OSI) model, or the TCP protocol stack model, both of which are well known in the art. The practical purpose of the client-based browser application is to enable a user to interact with the application through the display of plain text, and/or interactive, dynamic functionality in the form of buttons, text boxes, scroll down bars or other objects, widgets contained on one or more web pages constructed using the aforementioned HTML and/or XML.

Web pages are typically static or dynamic in nature. Those that are static typically display text as one would see it on a printed, physical page. Dynamic web pages, however, are interactive and allow for a user to input data, query data, and/or modify data just to name a few of the functionalities associated with dynamic web pages. The dynamic nature of web pages is a product of the use of the other technologies in combination with HTML and/or XML.

Some example embodiments may include one or more remote server computers connected to the client computer via an Internet. These remote servers can be a web server and/or application server. Web servers running JSP™ can include the APACHE™/APACHE TOMCAT™ web server. Web servers running ASP™ can include a Microsoft WINDOW WEB SERVER 2003™ utilizing Internet Information Services (IIS). Application servers running JSP™ can include the Orion Application Server or other J2EE™ certified application servers. Application servers running ASP™ can include WINDOWS SERVER 2003™. For example, a web server may serve a web page over a network that allows a user to enter in data. This data is then passed to an application server, wherein various methods described below are applied to this data.

In some embodiments, the logic level may be governed by a rule set written in a scripting language that controls how and when certain web pages, server pages, or pieces of content are provided to, or made accessible to, a particular user. This scripting language can be in the form of Java, Perl, Python, or some other general purpose scripting language. For example, once the logic of a JSP™ determines that a particular object (e.g., a text box) on a web page has been executed (e.g., rating record request is entered and sent), the data from this text box is inputted, and sent to a web and/or application server. It is the routine written in a scripting language that determines whether, for example, the title data is valid (e.g., that the proper title of a piece of digital content has been entered). Some example embodiments may further include a routine written in a scripting language to retrieve data from a storage, data structure, or database level. The storage level will be run by a separate database application, while, in other embodiments, a database embedded with a logic level will be implemented (e.g., a Native database).

In some embodiments, the above described client application forms may be used to interact with a logic level. For example, a C# form may take in data from a user and pass it to one of the above described web and/or application servers. Once passed to one of these servers via a network connection, various methods as described below may be applied to the data.

Some embodiments may include a storage level wherein tables of data are created, and data is inserted into, selected from, these tables using a Structured Query Language (SQL) or some other database-related language known in the art. These tables of data can be managed using a database application such as, for example, MYSQL™, SQLServer™, Oracle 8I™ or 10G™, or some other suitable database application. These tables are organized into a Relational-Database Schema (RDS) or Object-Relational-Database Schemas (ORDS), as is known in the art. These schemas can be normalized using certain normalization algorithms so as to avoid abnormalities such as non-additive joins and other problems. Additionally, these normalization algorithms include Boyce-Codd Normal Form or some other normalization, optimization algorithm known in the art. Some embodiments may include creating a series of database tables containing data related to digital content. These tables could be distinguished based upon the author of the rating information, the author of the digital content that is actually rated, the name of the content, or some other suitable means of distinguishing the rating information.

Some example embodiments may include the above described three tiers or levels being written as one or more software modules with each module contributing to the functionality of each level or tier. Common to many of these modules is the ability to generate, use and manipulate data and data sets. These modules, and associated functionality, may be used by either the client, server, or peer applications. These various modules can be implemented into the system on an as-needed basis. These modules may be written in an object-oriented-computer language such that a component oriented or object-oriented programming technique can be implemented using a Visual Component Library (VCL), Component Library for Cross Platform (CLX), Java Beans (JB), Java Enterprise Beans (EJB), Component Object Model (COM), or Distributed Component Object Model (DCOM) or other suitable technique. These modules are linked to other modules via various APIs and then compiled into one complete server and/or client application. Further, these modules, and the tiers that they make up, are linked together via various distributed programming protocols as distributed computing modules.

Some example embodiments may include remote procedure calls being used to implement one or more of the above described levels of the three-tier architecture across a distributed programming environment. For example, a logic level resides on a first computer system that is remotely located from a second computer system containing an Interface or storage level. These first and second computer systems can be configured in a server-client, peer-to-peer or some other configuration. These various levels can be written using the above described component design principles, and can be written in the same programming language, or a different programming language. Various protocols are implemented, to enable these various levels, and components contained therein, to communicate regardless of the programming language used to write these components. For example, a module written in C++ using the Common Object Request Broker Architecture (CORBA) or Simple Object Access Protocol (SOAP) can communicate with another remote module written in JAVA™. These protocols include SOAP and CORBA or some other suitable protocol. These protocols are well-known in the art.

In some embodiments, the above described components that make up the platform architecture communicate using the OSI or TCP/IP stack models for defining network protocols that facilitate the transmission of data. Applying these models, a system of data transmission between a server and client computer system can be described as a series of roughly five layers comprising as a: physical layer, data link layer, network layer, transport layer and application layer. Some example embodiments may include the various levels (e.g., the Interface, Logic and storage levels) residing on the application layer of the TCP/IP protocol stack. The present application may utilize HTTP to transmit content between the server and client applications, whereas in other embodiments another protocol known in the art is utilized. Content from an application residing at the application layer is loaded into the data load field of a TCP segment residing at the transport layer. This TCP segment also contains port information for a remote recipient application module. This TCP segment is loaded into the data field of an IP or UDP datagram residing at the network layer. Next, this IP datagram is loaded into a frame residing at the data link layer. This frame is then encoded at the physical layer and the content transmitted over a network such as an Internet, Local Area Network (LAN) or Wide Area Network (WAN). The terms Internet refers to a network of networks. Such networks may use a variety of protocols for exchange of information, such as TCP/IP, ATM, SNA, SDI, etc, and may be used within a variety of topologies or structures. This network may include a Carrier Sensing Multiple Access Network (CSMA) such an Ethernet based network. This network may include a Code Divisional Multiple Access (CDMA) network, or some other suitable network.

In some embodiments, when information is transferred or provided over a network or another communications connection (e.g., either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable medium. Computer-executable or computer-readable instructions comprise, for example, instructions and data which cause a general-purpose computer system or special-purpose computer system to perform a certain function or group of functions. The computer-executable or computer-readable instructions may be, for example, binaries, or intermediate format instructions such as assembly language, or even source code.

In this description, and in the following claims, a computer system is defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device (e.g., a mobile phone or PDA) where internal modules (e.g., a processor and memory) work together to perform operations on electronic data.

Some embodiments may be practiced in network computing environments with many types of computer system configurations, including hubs, routers, wireless Access Points (APs), wireless stations, personal computers, laptop computers, hand-held devices, multi-processor systems, microprocessor-based or programmable consumer electronics, network Personal Computers (PCs,) minicomputers, mainframe computers, mobile telephones, PDAs, pagers, and the like. One embodiment can also be practiced in distributed system environments where local and remote computer systems, which are linked (e.g., either by hardwired, wireless, or a combination of hardwired and wireless connections) through a network, both perform tasks. In a distributed system environment, program modules may be located in both local and remote memory-storage devices (see below).

Figure 7:
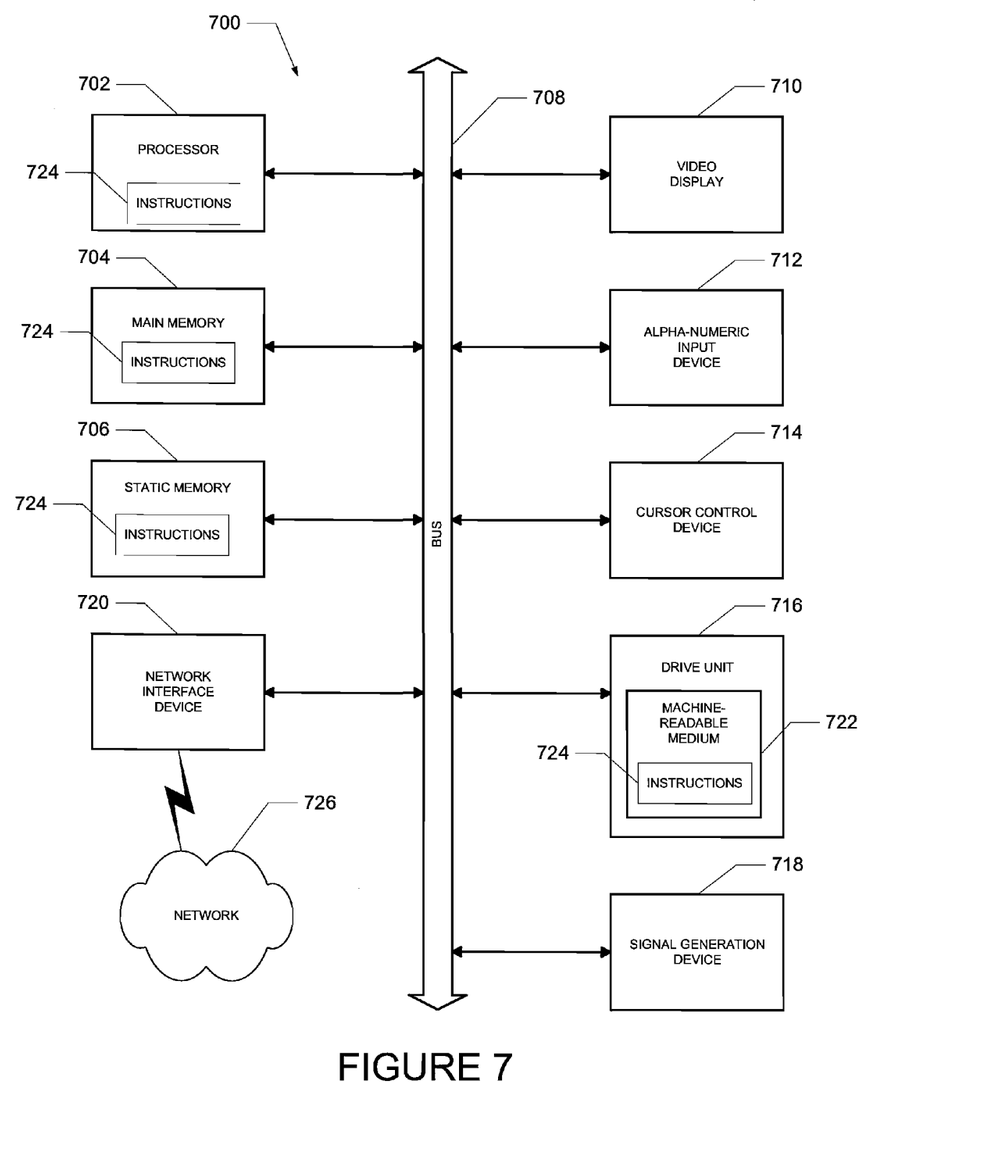
FIG. 7 shows a diagrammatic representation of a machine in the form of a computer system within which a set of instructions, for causing the machine to perform any one or more of the methodologies discussed herein, may be executed, according to an example embodiment.

FIG. 7 illustrates a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a computer system (e.g., a standalone, client or server computer system) configured by an application may constitute a "module" that is configured and operates to perform certain operations as described herein below. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any non-transitory medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, and optical and magnetic media.

As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. FIGS. 1 to 7 are merely representational and may not be drawn to scale. Certain proportions thereof may be exaggerated, while others may be minimized. Accordingly, the specification and drawings are to be regarded in an illustrative rather than a restrictive sense.

The following description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, systems and methods to detect and characterize middleboxes are described. Although embodiments have been described with reference to specific example embodiments, it will be evident that various modifications and changes may be made to these embodiments without departing from the broader spirit and scope of embodiments as expressed in the subjoined claims.

What is claimed is:

1. A method comprising:
   embedding a web beacon into web content to direct a client to a detection server;
   serving client code to the client, in response to activation of the web beacon, the client code, executed at the client, to gather client information related to middlebox detection;
   receiving client information related to middlebox detection from the client;
   using the client information to perform middlebox detection analysis;
   using a standalone middlebox detection module that is not executed at the client to augment the middlebox detection analysis; and
   using the middlebox detection analysis to determine if a middlebox exists on a path between a first communicating entity and a second communicating entity.

2. The method as claimed in claim 1 wherein performing middlebox detection analysis includes HTTP header analysis.

3. The method as claimed in claim 1 wherein performing middlebox detection analysis includes performing Synchronization packet fingerprinting.

4. The method as claimed in claim 1 wherein performing middlebox detection analysis includes collecting User-Agent string information.

5. The method as claimed in claim 1 wherein receiving client information includes using a client applet to gather client configuration information.

6. The method as claimed in claim 1 wherein the client information includes client timezone parameter information.

7. The method as claimed in claim 1 wherein the client information includes client language parameter information.

8. The method as claimed in claim 1 wherein the client information includes network round-trip timing information.

9. An article of manufacture comprising a non-transitory machine-readable storage medium having machine executable instructions embedded thereon, which when executed by a machine, cause the machine to:
   embed a web beacon into web content to direct a client to a detection server;
   serve client code to the client, in response to activation of the web beacon, the client code, executed at the client, to gather client information related to middlebox detection;
   receive client information related to middlebox detection from the client;
   use the client information to perform middlebox detection analysis;
   use a standalone middlebox detection module that is not executed at the client to augment the middlebox detection analysis; and
   use the middlebox detection analysis to determine if a middlebox exists on a path between a first communicating entity and a second communicating entity.

10. The article of manufacture as claimed in claim 9 being configured to perform HTTP header analysis.

11. The article of manufacture as claimed in claim 9 being configured to perform Synchronization packet fingerprinting.

12. The article of manufacture as claimed in claim 9 being configured to use a client applet to gather client configuration information.

13. A system comprising:
   a processor;
   a memory coupled to the processor to store information related to middlebox detection; and
   a middlebox detection system to embed a web beacon into web content to direct a client to a detection server, to serve client code to the client, in response to activation of the web beacon, the client code, executed at the client, to gather client information related to middlebox detection, to receive client information related to middlebox detection from the client, to use the client information to perform middlebox detection analysis, to use a standalone middlebox detection module that is not executed at the client to augment the middlebox detection analysis, and to use the middlebox detection analysis to determine if a middlebox exists on a path between a first communicating entity and a second communicating entity.

14. The system as claimed in claim 13 being configured to perform HTTP header analysis.

15. The system as claimed in claim 13 being configured to perform Synchronization packet fingerprinting.

16. The system as claimed in claim 13 being configured to use a client applet to gather client configuration information.

* * * * *

UNITED STATES PATENT AND TRADEMARK OFFICE
CERTIFICATE OF CORRECTION

PATENT NO.         : 8,463,904 B2
APPLICATION NO.    : 13/309860
DATED              : June 11, 2013
INVENTOR(S)        : Casado et al.

It is certified that error appears in the above-identified patent and that said Letters Patent is hereby corrected as shown below:

On Title page 2, in column 1, under "Other Publications", line 6, delete "S," and insert --S.,--, therefor On Title page 2, in column 2, under "Other Publications", line 3, delete "Mailed" and insert --mailed--, therefor In the Specification:

In column 3, line 17, delete "tum," and insert --turn,--, therefor

In column 9, line 51, after "be", insert --used--, therefor

In column 10, line 23, delete "Such" and insert --In such--, therefor

In column 12, line 64, after "such" and insert --as--, therefor

In column 13, line 6, before "a", insert --as--, therefor

Signed and Sealed this
Third Day of September, 2013

Teresa Stanek Rea
*Acting Director of the United States Patent and Trademark Office*